(12) United States Patent
He

(10) Patent No.: US 10,257,749 B2
(45) Date of Patent: Apr. 9, 2019

(54) INFORMATION INTERACTION METHOD, SYSTEM AND BASE STATION

(71) Applicant: ZTE Corporation, Shenzhen, Guangdong (CN)

(72) Inventor: Feng He, Shenzhen (CN)

(73) Assignee: ZTE Corporation, Shenzhen, Guangdon (CN)

( * ) Notice: Subject to any disclaimer, the term of this patent is extended or adjusted under 35 U.S.C. 154(b) by 232 days.

(21) Appl. No.: 15/119,530

(22) PCT Filed: Jun. 5, 2014

(86) PCT No.: PCT/CN2014/079306
§ 371 (c)(1),
(2) Date: Sep. 22, 2016

(87) PCT Pub. No.: WO2015/123939
PCT Pub. Date: Aug. 27, 2015

(65) Prior Publication Data
US 2017/0078918 A1    Mar. 16, 2017

(30) Foreign Application Priority Data
Feb. 18, 2014    (CN) .......................... 2014 1 0054998

(51) Int. Cl.
*H04W 28/08* (2009.01)
*H04W 28/02* (2009.01)
(Continued)

(52) U.S. Cl.
CPC ........... *H04W 28/08* (2013.01); *H04W 28/02* (2013.01); *H04W 28/0205* (2013.01);
(Continued)

(58) Field of Classification Search
CPC . H04W 28/08; H04W 28/02; H04W 28/0205; H04W 28/16
See application file for complete search history.

(56) References Cited

U.S. PATENT DOCUMENTS 9,906,994 B2 *   2/2018   He .................... H04W 36/0033
2012/0140704 A1   6/2012   Zhao
(Continued)

FOREIGN PATENT DOCUMENTS

CN    101072391 A    11/2007
CN    102438248 A    5/2012
(Continued)

OTHER PUBLICATIONS

International Search Report in international application number: PCT/CN2014/079306, mailed on Nov. 28, 2014, 2 pgs.
(Continued)

*Primary Examiner* — Chi H Pham
*Assistant Examiner* — Weibin Huang
(74) *Attorney, Agent, or Firm* — Cooper Legal Group, LLC

(57) ABSTRACT

Disclosed are an information interaction method and system and a base station. The information interaction method of the present disclosure is applied to a dual connectivity data offloading technology in a Long Term Evolution (LTE) system, and specifically includes that a sending party sends information related to processing user plane data to a corresponding receiving party in batches according to a preset rule.

5 Claims, 5 Drawing Sheets

(51) Int. Cl.
*H04W 28/16* (2009.01)
*H04W 92/20* (2009.01)

(52) U.S. Cl.
CPC ........ *H04W 28/16* (2013.01); *H04W 28/0236* (2013.01); *H04W 92/20* (2013.01)

(56) References Cited

U.S. PATENT DOCUMENTS

| | | |
|---|---|---|
| 2013/0260742 A1 | 10/2013 | Marvell World Trade Ltd |
| 2014/0328182 A1* | 11/2014 | Gao ............ H04W 28/08 370/236 |
| 2014/0355562 A1* | 12/2014 | Gao ............ H04B 7/02 370/331 |
| 2016/0212790 A1* | 7/2016 | Fujish Iro; Masato ............ H04L 45/24 |
| 2016/0219481 A1* | 7/2016 | Wang ............ H04W 28/085 |

FOREIGN PATENT DOCUMENTS

| | | |
|---|---|---|
| CN | 102958102 A | 3/2013 |
| CN | 103369726 A | 10/2013 |

OTHER PUBLICATIONS

NEC. "R3-140679: Flow Control function over X2 for Dual connectivity" 3GPP Tsg-Ran 1-13 WG3#83bis, 04 Apr. 2013 (04.04. 2013) chapter 1, section 2.3, 3 pgs.

English Translation of the Written Opinion of the International Search Authority in international application number: PCT/CN2014/079306, mailed on Nov. 28, 2014, 7 pgs.

3GPP TSG-RAN WG3 Meeting #83 R3-140120; Feb. 14, 2014; Huawei; "Data Transmission to Support Dual Connectivity UP 3C", 3 pgs.

* cited by examiner

INFORMATION INTERACTION METHOD, SYSTEM AND BASE STATION

TECHNICAL FIELD

The present disclosure relates to communications and in particular to an information interaction method and system and a base station.

BACKGROUND

Along with the continuous evolution of a wireless communication technology and standard, a mobile packet service has achieved a great development, and data throughput of a single terminal is continuously improved. For example, a Long Term Evolution (LTE) system may support data transmission at a maximum downlink rate of 100 Mbps within a 20 M bandwidth. In a subsequent enhanced LTE network, a data transmission rate will be further increased and even may reach 1 Gbps.

An existing LTE user plane data protocol stack is shown in FIG. 1. Downlink data received from a core network through a General Packet Radio Service Tunneling Protocol for the User Plane (GTP-U) layer, after being unpacked, is processed by a Packet Data Convergence Protocol (PDCP) layer, a Radio Link Control (RLC) layer, a Medium Access Control (MAC) layer and a Port Physical (PHY) layer for sending to User Equipment (UE); and sending of uplink data is exactly opposite to that of the downlink data. At present, a data transmission link between a network and UE is a one-to-one dedicated link, so that signal quality and adopted resource size of the link determine data transmission performance therebetween. User experiences of the UE may be reduced if a resource adopted by the link is limited or the signal quality of the link is relatively poor, which is a huge challenge a mobile operator is confronted with now. Although being expanded year by year, network capacity may still not catch up with increase of the number of user terminals and requirements of users on data services.

In order to meet an increase requirement of data services, an operator increases Low Power Nodes (LPNs) or called small cells or Pico eNBs for hotspot enhancement in a process of deploying a new-generation communication network (such as an LTE network). At present, many corporations and operators tend to adopt a dual connectivity offloading technology for solving the problem of non-uniformity of areal distribution of services. In the dual connectivity offloading technology, a terminal may keep connections with two or more than two network nodes at the same time (dual connectivity in the present disclosure is only a general term and the number of connected nodes is not limited). As shown in FIG. 2, a master node is called a Master eNB (MeNB) or a macro eNB, and other nodes are called Secondary eNBs (SeNBs) or Pico eNBs or LPNs, and are connected with the master node through Xn interfaces. For example, UE keeps connections with a macro cell and an LPN at the same time. A network side may regulate transmission data amounts of the UE on an MeNB and an SeNB in real time in case of unbalanced network load, and meanwhile, if the SeNB is changed due to movement of the UE or another factor, the connection with the other cell may still be kept, and such a change may not cause excessive signalling impact.

During specific data transmission, for how to distribute data originally on a connection to two connections, it is considered that there may currently be multiple offloading manners in the art, and an offloading manner based on which the main problem is solved in the present disclosure is shown in FIG. 3. When downlink data is transmitted, service data of bearer 2 on an MeNB at a sender is divided into two parts in a PDCP layer, is submitted to a local lower RLC layer and an RLC layer of an SeNB respectively, and is finally sent to a terminal.

According to a data transmission mechanism in an existing protocol, there exists information interaction among different protocol layers in a data transmission process of a sender. In order to ensure effective transmission, a PDCP layer may implement information interaction with an RLC layer. For example, in FIG. 4, a PDCP layer may interact with an RLC layer to ensure effective transmission. For example, for bearer data mapped to an RLC Acknowledge Mode (AM): (1) a PDCP layer in a bearer on an MeNB side irregularly notifies an RLC layer in a corresponding bearer on an SeNB side that it discards a user plane data packet; and (2) after successfully sending a data packet sent by a PDCP layer in a certain bearer at the MeNB side, the RLC layer in the bearer at the SeNB side may send feedback information to the PDCP layer to notify the PDCP layer of a sending condition of the data packet.

When a PDCP layer and an RLC layer are located in the same eNB, interaction between the PDCP layer and the RLC layer may be specifically implemented completely in equipment, while in a dual connectivity scenario, a PDCP layer at an MeNB side and an RLC layer at an SeNB side are located in different eNBs, so that interaction therebetween involves interaction between the two eNBs, and an entity (called a PDCP layer entity for short below) where the PDCP layer at the MeNB side is located may interact with an entity (called an RLC layer entity for short below) where the RLC layer at the SeNB side only through an Xn interface. Based on a present definition about an attribute of an Xn interface, a bandwidth of the Xn interface is limited, a PDCP layer and an RLC layer directly send information irregularly at present, which may easily cause unbalance of amounts of information sent every time, and for example, an excessive amount of information is sent sometimes, but a small amount of information is sent at other times. When an MeNB or an SeNB sends excessive information, the information is required to be queued for sending due to the fact that a bandwidth of an interface is insufficient, which may cause the problem of delay. In addition, excessive information may also cause the problems of disorder and packet loss during information transmission.

SUMMARY

In order to solve the existing technical problem, the embodiments of the present disclosure mainly provide an information interaction method and system and an eNB.

The embodiments of the present disclosure provide an information interaction method, which is applied to a dual connectivity data offloading technology of an LTE system, including that:

a sending party sends information related to processing user plane data to a corresponding receiving party in batches according to a preset rule.

Similarly, the embodiments of the present disclosure further provide an eNB, which is applied to a dual connectivity data offloading technology in an LTE system, including: a sending module and a data processing module, wherein the data processing module may be configured to process user plane data of a bearer of the eNB; and the sending module may be configured to send information related to processing user plane data by the data processing module in batches to an opposite eNB according to a preset rule.

The embodiments of the present disclosure further provide an information interaction system, which is applied to a dual connectivity data offloading technology in an LTE system, including a first eNB and a second eNB, wherein the first eNB may include: a first data processing module and a first sending module, and the second eNB may include: a second data processing module and a second sending module;

the first data processing module may be configured to process user plane data of a bearer of the first eNB;

the first sending module may be configured to send information related to processing the user plane data by the first data processing module to the second eNB in batches according to a preset rule;

the second data processing module may be configured to process user plane data of a bearer of the second eNB; and the second sending module may be configured to send information related to processing the user plane data by the second data processing module to the first eNB in batches according to a preset rule.

The embodiments of the present disclosure have the following beneficial effects.

According to the information interaction method and system and eNB provided by the embodiments of the present disclosure, the problems of time delay, disorder and packet loss caused by limitations to a bandwidth of a communication interface during information interaction of an MeNB or an SeNB in a conventional art are solved. The information interaction method provided by the present disclosure is applied to the dual connectivity data offloading technology in the LTE system, and specifically includes that: the sending party sends the information related to processing the user plane data to the corresponding receiving party in batches according to the preset rule. According to the information interaction method of the present disclosure, the information is sent in batches, and then the amount of information sent every time is not so large, so that the information to be sent is prevented from being queued at the interface, and the problem of delay is solved. Since the amount of the information sent every time is not so large, a packet loss rate may also be reduced. Compared with the conventional art, the method of the present disclosure has the advantages that requirements of high delay and limited bandwidth of an Xn interface may be maximally adapted and a compromise between efficiency and performance is achieved. In addition, by the method of the present disclosure, flexibility in interaction betweenthere is also ensured, and complexity in specific implementation is reduced.

DETAILED DESCRIPTION

In the embodiments of the present disclosure, a sending party sends information related to processing user plane data to a corresponding receiving party in batches according to a preset rule, thereby avoiding the information to be sent being queued at an interface and solving the problem of information delay. Further, the amount of information sent every time is not too large, so that a packet loss rate may also be reduced.

The present disclosure will be further described below with reference to specific embodiments and the drawings in detail.

Embodiment 1

Figure 1:
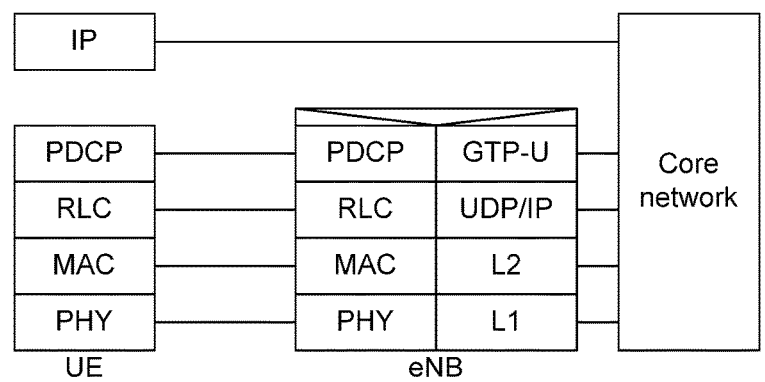
FIG. 1 is a diagram illustrating an LTE user plane protocol stack.
Figure 2:
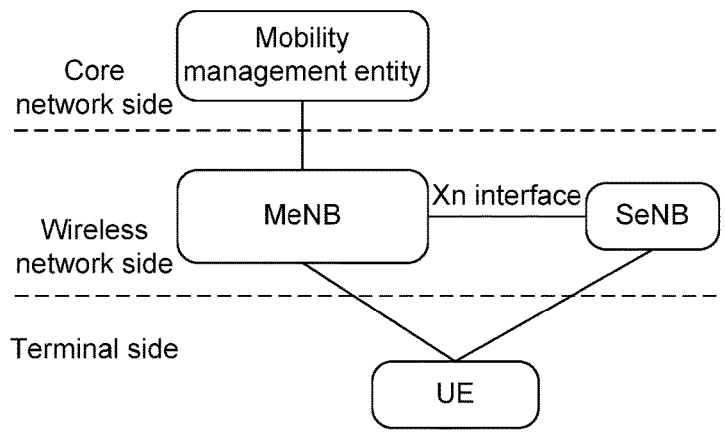
FIG. 2 is a diagram illustrating a dual connectivity scenario.
Figure 3:
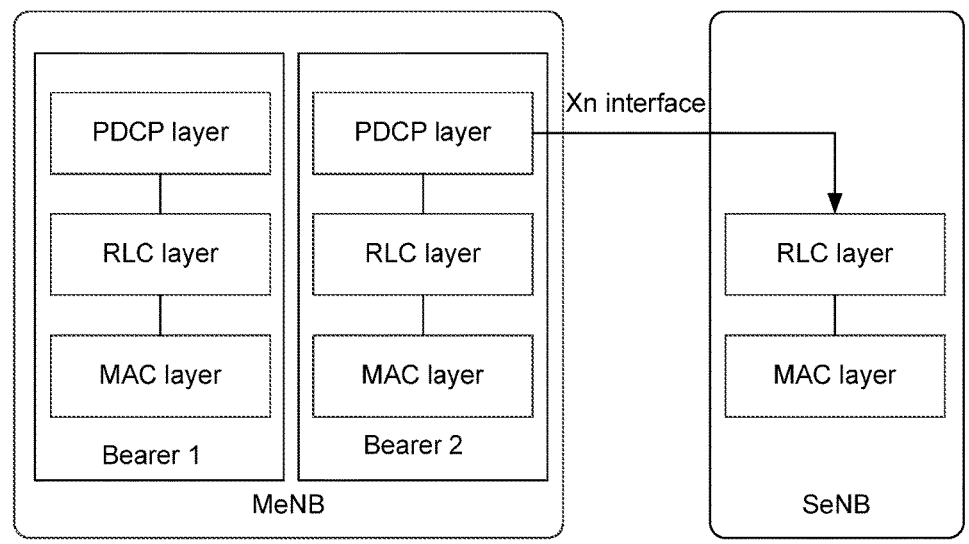
FIG. 3 is a diagram illustrating a dual connectivity data offloading manner.
Figure 4:
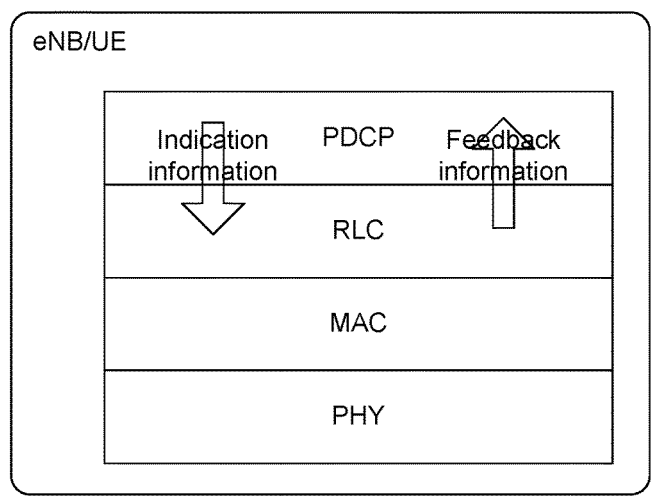
FIG. 4 is a diagram illustrating an interaction function of PDCP and RLC layers in an existing protocol.
Figure 5:
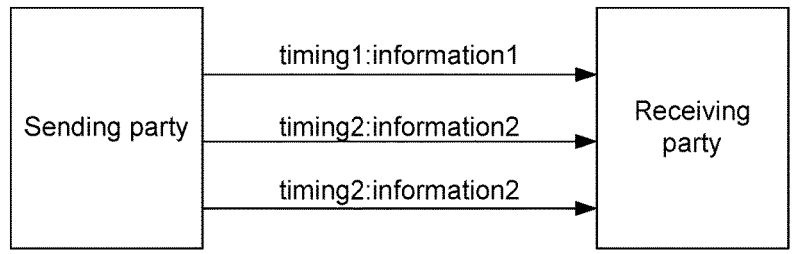
FIG. 5 is a diagram illustrating an information interaction method according to embodiment 1 of the present disclosure.

The embodiment provides an information interaction method, which is applied to a dual connectivity data offloading technology in an LTE system, and in which a sending party sends information related to processing user plane data to a corresponding receiving party in batches according to a preset rule. In order to explain what "in batches" means in the present disclosure, descriptions will be made below by way of an example. Referring to FIG. 5, the sending party sends information 1 to the receiving party at timing 1, sends information 2 to the receiving party at timing 2, and sends information 3 to the receiving party at timing 3. Intervals of timings 1, 2 and 3 may be the same or different. Similarly, the sending party may also send information 1 to the receiving party when event 1 happens, send information 2 to the receiving party when event 2 happens and send information 3 to the receiving party when event 3 happens. Events 1, 2 and 3 may be the same or different. The preset rule may be preconfigured by an upper layer, or may be preconfigured by an Operation Administration and Maintenance (OAM) entity.

According to the information interaction method of the embodiment, the information related to processing the user plane data by the sending party is sent to the receiving party in batches, so that the problems of delay, disorder and packet loss caused by limitations to a bandwidth of a communication interface when all the information related to processing the user plane data is sent to the receiving party through the communication interface at a certain timing are solved.

Preferably, processing the user plane data in the embodiment may include: discarding the user plane data, sending the user plane data, or statistically analyzing status of the user plane data. Of course, it should be understood that processing the user plane data in the embodiment may also be other processing for the user plane data, which those skilled in the art know.

The information related to processing the user plane data in the embodiment is information related to processing the user plane data of its bearer by the sending party, and may specifically include number information of a data packet in a user plane data processing process, or packet loss rate or delay information of the data packet, or other information related to transmission of the user plane data, such as feedback information for successfully sending or failure to send.

Preferably, the information related to processing the user plane data in the embodiment further includes: bearer identification information of a bearer corresponding to the user plane data.

In the embodiment, a manner for sending the related information to the receiving party in batches according to the preset rule may include at least one of the following two manners.

First, when a specified time interval expires, the sending party sends the information related to processing the user plane data to the corresponding receiving party. For example, the specified time interval is determined as a period for repeated triggering, that is, the sending party periodically sends the information related to processing the user plane data. The period may be set according to a requirement for the bandwidth of the communication interface. Of course, the information may also be sent at uneven time intervals. For example, the first time interval is 1 second, the second time interval is 2 seconds, and so on. In the method of the embodiment, the sending party periodically sends the information to the receiving party, and then the information may be periodically sent to the receiving party to prevent information accumulation, thereby solving the problems of delay and packet loss caused by the excessively large amounts of the sent information.

Second, when processing the user plane data by the sending party meets a preset condition, the sending party sends the information related to processing the user plane data to the receiving party. Such a manner may determine occurrence of a specified data event as a triggering condition, and the specified data event may include that: specified data is subjected to certain processing, for example: data of one or more data packets is discarded, or one or more data packets are successfully sent, or a status of a local data cache changes. In such a manner, the amount of the information sent every time is set and a sending mechanism is triggered under the triggering condition. If the amount of the information sent every time is set to be matched with the bandwidth of the communication interface, information sending timeliness may be ensured, and information sending smoothness may also be ensured. The specified data event may also be that processing the user plane data meets a certain requirement. For example, the data is processed to a certain extent, or a certain amount of data is processed, or a preset result is obtained after the data is processed.

Preferably, the condition that processing the user plane data by the sending party meets the preset condition in the embodiment includes that the sending party processes the user plane data.

The sending in batches of the embodiment may also include both of the abovementioned two manners. That is, the information may be sent only when the abovementioned two conditions are both met. For example, after the sending party processes the user plane data, the information related to processing the user plane data is sent to the receiving party after the period expires. Such a combined sending mechanism is a simple combination of the abovementioned two sending mechanisms. Those skilled in the art may flexibly configure the abovementioned two simple mechanisms, and no detailed descriptions will be made herein.

In the embodiment, the sending party may include: an MeNB, a PDCP layer entity in a bearer at an MeNB side, an SeNB and an RLC layer entity in a bearer at an SeNB side. Correspondingly, the receiving party may include: an SeNB, an RLC layer entity in a bearer at an SeNB side, an MeNB and a PDCP layer entity in a bearer at an MeNB side.

Embodiment 2

Figure 6:
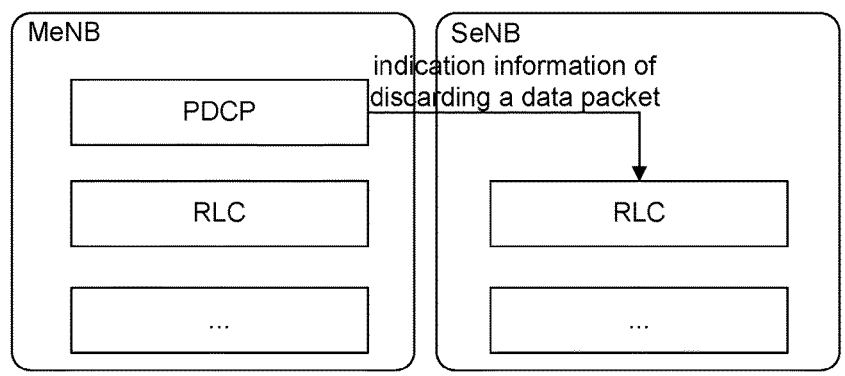
FIG. 6 is a diagram illustrating an information interaction method according to embodiment 2 of the present disclosure.

As shown in FIG. 6, a sending party, i.e. a PDCP layer entity at an MeNB side, triggers sending of indication information of discarding a user plane data packet by the PDCP layer entity to an RLC layer entity at an SeNB side according to a specific data processing event, the information including number information of the data packet discarded by the PDCP layer entity. The number information refers to a count value of the PDCP data packet (PDCP COUNT), including a Hyper Frame Number (HFN) and Sequence Number (SN) of the data packet, or only using the SN of the data packet. The RLC layer entity at the SeNB side determines whether to stop sending the data packet indicated in the indication information or not according to the indication information.

Herein, the condition that processing user plane data meets a preset condition in the embodiment includes that: a processing event of the user plane data is triggered, and similarly, a similar condition is involved in the following embodiments adopting a specific data processing event as a triggering condition. Specific data processing event triggering refers to discarding one or more data packets by the PDCP layer entity. That is, only when the PDCP layer entity discards a data packet, the PDCP layer entity sends the discarding indication information to the RLC layer entity, otherwise does not send the related information.

Optionally, in the embodiment, the PDCP layer entity may also trigger sending of the information according to a specific period, wherein the specific period may be configured by an upper layer, or may be preconfigured by an OAM entity.

Embodiment 3

Figure 7:
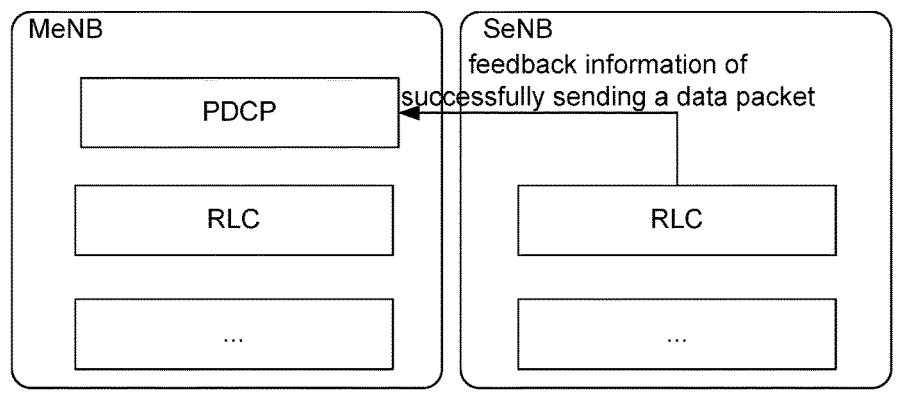
FIG. 7 is a diagram illustrating an information interaction method according to embodiment 3 of the present disclosure.

As shown in FIG. 7, an RLC layer entity at an SeNB side sends feedback information of successfully sending a PDCP user plane data packet by the RLC layer entity to the PDCP layer entity at an MeNB side according to a specific period, the information including number information of the PDCP data packet successfully sent by the RLC layer entity. The number information may refer to a count value of the PDCP data packet, or an SN of the data packet. The PDCP layer entity at the MeNB side determines whether to clear the corresponding data packet in a cache or not according to the feedback information.

In the embodiment, the specific period may be configured by an upper-layer protocol of the eNB, or may be preconfigured by an OAM entity. In the embodiment, data is periodically sent, that is, the time intervals specified in the embodiment are equal. Similarly, a similar condition is involved in the following embodiments adopting a specific period as a triggering condition.

Optionally, the RLC layer entity at the SeNB side may also trigger sending the information according to a specific data processing event, and the specific event refers to that the RLC layer entity may be triggered to send the information when the RLC layer entity successfully sends one or more PDCP layer Protocol Data Unit (PDU) data packets, otherwise does not send the related information.

Optionally, sending of the information may also be triggered by both the period and the event. That is, the two triggering manners are combined for triggering.

Embodiment 4

Figure 8:
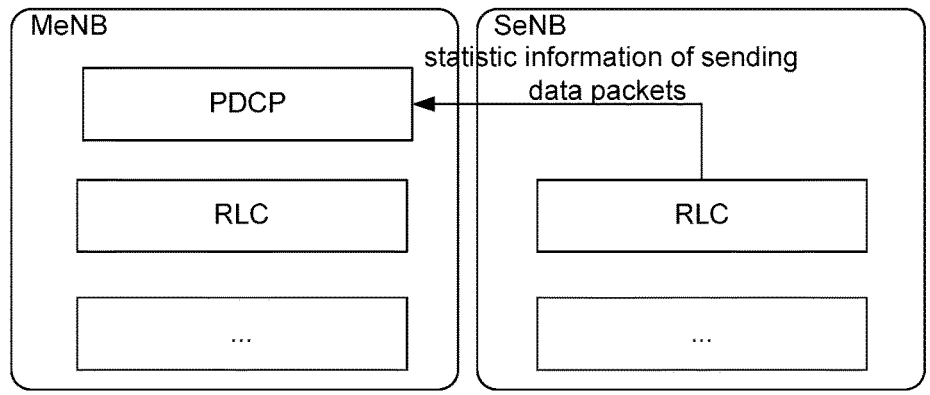
FIG. 8 is a diagram illustrating an information interaction method according to embodiment 4 of the present disclosure.

As shown in FIG. 8, an RLC layer entity at an SeNB side sends statistic information of a PDCP user plane data packet by the RLC layer entity to a PDCP layer entity at an MeNB side according to a specific period, wherein the sending statistic information includes packet loss rate and delay information of the sent PDCP data packet obtained statistically. A manner for obtaining the packet loss rate and the delay information is determined by a specific implementation mode, and is unrelated to the present disclosure, thereby not being elaborated herein. The PDCP layer entity at the MeNB side further makes statistic on information about quality of service of a related bearer according to the statistic information.

In the embodiment, the specific period may be configured by an upper-layer protocol of the eNB. For example, the specific period is indicated by the MeNB through signalling, or may be preconfigured by an OAM entity.

Optionally, the RLC layer entity may also trigger sending the information according to a specific data processing event, and the specific event refers to that the related information is sent immediately only when the statistic information is obtained, otherwise is not sent.

Embodiment 5

Figure 9:
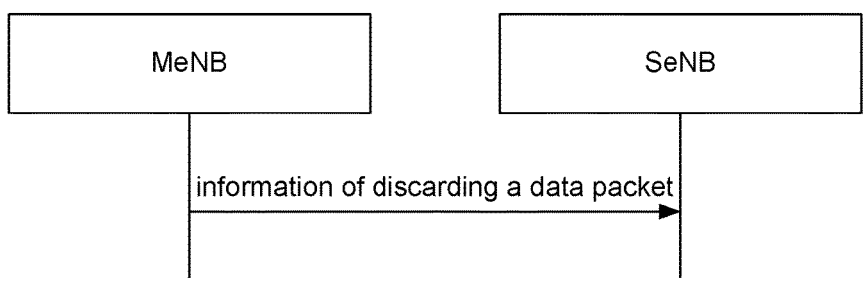
FIG. 9 is a diagram illustrating an information interaction method according to embodiment 5 of the present disclosure.

As shown in FIG. 9, a sending party is an MeNB where PDCP layer entities are located, and triggers sending indication information of discarding user plane data packets by the PDCP layer entities of one or more bearers at the MeNB side to an SeNB where RLC layer entities are located according to a specific data processing event, the information including identification information of the one or more bearers and number information of the data packets discarded by the PDCP layer entities of each bearer, wherein the number information refers to count values of the PDCP data packets, or SNs of the data packets. Each of the RLC layer entities at the SeNB side determines whether to stop sending the PDCP data packet corresponding to the corresponding bearer or not according to the discarding indication information of the corresponding bearer in the information.

Herein, specific data processing event triggering refers to that the PDCP layer entities of the one or more bearers at the MeNB side discard one or more data packets.

Optionally, in the embodiment, the MeNB may also trigger sending the information according to a specific period, wherein the specific period may be configured by an upper-layer protocol of the eNB, or may be preconfigured by an OAM entity.

Embodiment 6

Figure 10:
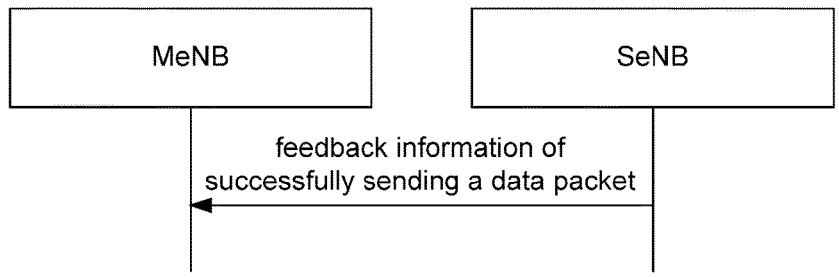
FIG. 10 is a diagram illustrating an information interaction method according to embodiment 6 of the present disclosure.

As shown in FIG. 10, an SeNB sends feedback information of successfully sending PDCP user plane data packets by RLC layer entities of one or more bearers at the SeNB side to an MeNB according to a specific period, the information including identification information of the one or more bearers and number information of the PDCP data packets successfully sent by each RLC layer entity. The number information may refer to count values of the PDCP data packets, or SNs of the data packets. The MeNB determines processing of the PDCP layer entities of each bearer over each piece of data in the cache of each bearer according to numbers of the PDCP data packets successfully sent by each bearer in the feedback information.

In the embodiment, the specific period may be configured by an upper-layer protocol of the eNB, or may be preconfigured by an OAM entity.

Optionally, the SeNB may also trigger sending the information according to a specific data processing event. The specific event refers to that the RLC layer entities may be triggered to send the information when the RLC layer entities of the one or more bearers of the SeNB successfully send one or more PDCP layer PDU data packets, otherwise does not send the related information.

Optionally, sending of the information may also be triggered by both the period and the event. That is, the two triggering manners are combined for triggering.

Embodiment 7

Figure 11:
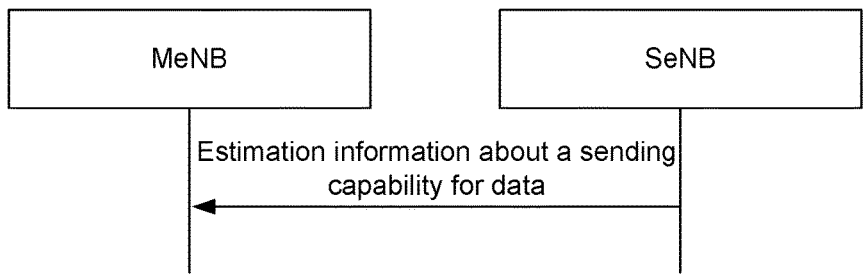
FIG. 11 is a diagram illustrating an information interaction method according to embodiment 7 of the present disclosure.

As shown in FIG. 11, an SeNB sends estimation information about a sending capability of the SeNB for offloaded PDCP data packets of an MeNB to the MeNB according to a specific period and a data processing event triggering rule, wherein the estimation information represents the number, estimated by the SeNB, of PDCP data packets which may be sent by RLC layer entities of a part or all bearers on the SeNB within a specified estimation period. Herein, an estimation method is determined by a specific implementation mode, and is unrelated to the present disclosure, thereby not being elaborated herein. The specified estimation period may be preconfigured by an OAM entity or configured for the SeNB by the MeNB through signalling. The MeNB determines the number of the PDCP data packets offloaded by the PDCP entities of each offloading bearer to the RLC layer entities at the SeNB side in the next step according to the received estimation information.

Optionally, the information sent by the SeNB may further include identification information of one or more bearers.

In the embodiment, the SeNB may optionally trigger sending the information according to a specific data processing event or a specific period.

Embodiment 8

Figure 12:
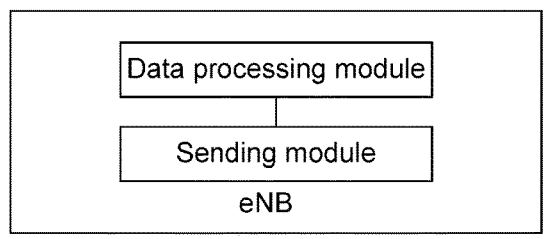
FIG. 12 is a structural diagram illustrating an eNB according to embodiment 8 of the present disclosure.

As shown in FIG. 12, the embodiment provides an eNB, which is applied to a dual connectivity data offloading technology of an LTE system, including: a sending module and a data processing module, wherein the data processing module is configured to process user plane data carried by the eNB; and the sending module is configured to send information related to processing the user plane data by the data processing module to an opposite eNB in batches according to a preset rule.

The eNB in the embodiment may send the information in batches, so that the problems of delay, disorder and packet loss caused by limitations to a bandwidth of a communication interface between the eNBs are solved.

Preferably, the sending module is configured to:

when a specified time interval expires, send the information related to processing the user plane data by the data processing module to the opposite eNB;

and/or when processing the user plane data by the data processing module meets a preset condition, send the information related to processing the user plane data by the data processing module to the opposite eNB.

Preferably, processing the user plane data by the data processing module comprises: discarding the user plane data, sending the user plane data, or statistically analyzing status of the user plane data.

Preferably, under the condition that the sending module is configured to, when processing the user plane data by the data processing module meets the preset condition, send the information related to processing the user plane data by the data processing module to the opposite eNB, when the eNB serves as a Master eNB (MeNB) and the data processing module is a Packet Data Convergence Protocol (PDCP) layer entity, the condition that processing the user plane data by the data processing module meets the preset condition comprises that: the PDCP layer entity performs discarding a user plane data packet, and the information related to processing the user plane data comprises: indication information of discarding the user plane data packet by the PDCP layer entity;

when the eNB serves as a Secondary eNB (SeNB) and the data processing module is a Radio Link Control (RLC) layer entity, the condition that processing the user plane data by the data processing module meets the preset condition comprises that: the RLC layer entity performs sending a user plane data packet offloaded by a PDCP layer entity, and the information related to processing the user plane data comprises: feedback information of successfully sending the user plane data packet of the PDCP layer entity by the RLC layer entity carried at the SeNB side;

when the eNB serves as an SeNB and the data processing module is an RLC layer entity, the condition that processing the user plane data by the data processing module meets the preset condition comprises that: the RLC layer entity performs statistical analysis on user plane data packets of a PDCP layer entity, and the information related to processing the user plane data comprises: statistic information of sending the user plane data packet of the PDCP layer entity by the RLC layer entity carried at the SeNB side; and when the eNB serves as an SeNB, the condition that processing the user plane data by the data processing module meets the preset condition comprises that: the data processing module performs estimation on a sending capability for a data packet of a PDCP layer entity of an MeNB, and the information related to processing the user plane data comprises: estimation information about the sending capability for the data packet of the PDCP layer entity of the MeNB.

Embodiment 9

Figure 13:
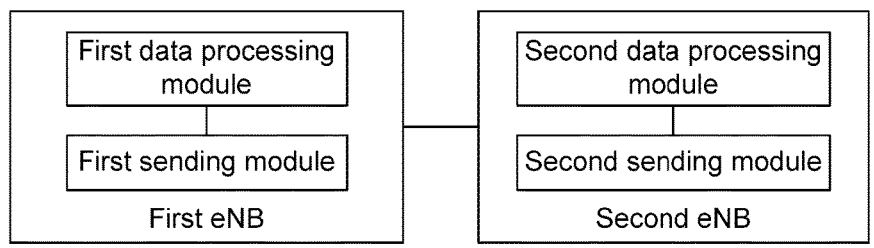
FIG. 13 is a structural diagram illustrating an information interaction system according to embodiment 9 of the present disclosure.

As shown in FIG. 13, the embodiment provides an information interaction system, which is applied to a dual connectivity data offloading technology in an LTE system, including a first eNB and a second eNB, wherein the first eNB includes: a first data processing module and a first sending module, and the second eNB includes: a second data processing module and a second sending module.

The first data processing module is configured to process user plane data carried by the first eNB.

The first sending module is configured to send information related to processing the user plane data by the first data processing module to the second eNB in batches according to a preset rule.

The second data processing module is configured to process user plane data carried by the second eNB.

The second sending module is configured to send information related to processing the user plane data by the second processing module to the first eNB in batches according to a preset rule.

Preferably, the first sending module is configured to:

when a specified time interval expires, send the information related to processing the user plane data by the first data processing module to the second eNB;

and/or when processing the user plane data by the first data processing module meets a preset condition, send the information related to processing the user plane data by the first data processing module to the second eNB.

Preferably, the second sending module is configured to:

when a specified time interval expires, send the information related to processing the user plane data by the second data processing module to the first eNB;

and/or when processing the user plane data by the second data processing module meets a preset condition, send the information related to processing the user plane data by the second data processing module to the first eNB.

Preferably, processing the user plane data by the first data processing module or the second data processing module comprises: discarding the user plane data, sending the user plane data, or statistically analyzing status of the user plane data.

In the embodiment, the system may solve consistency problems during interaction between different eNBs and ensure that interaction parties effectively understand interaction information from each other. In addition, the interaction solution may be maximally adapted to meet requirements for high delay and limited bandwidth of an Xn interface and achieve a compromise between efficiency and performance. Meanwhile, flexibility in interaction between the two parties is also ensured, and complexity in specific implementation is reduced.

The above contents are detailed descriptions further made to the present disclosure with reference to specific embodiments, and these descriptions may not be considered as limits to specific implementation of the present disclosure. Those skilled in the art to which the present disclosure belongs may also make a plurality of simple deductions or replacements without departing from the concept of the present disclosure, which shall fall within the scope of protection of the present disclosure.

The invention claimed is:

1. An information interaction method, applied to a dual connectivity data offloading technology in a Long Term Evolution (LTE) system, comprising: sending, by a sending party, information related to processing user plane data to a corresponding receiving party in batches according to a preset rule, wherein processing the user plane data comprises: discarding the user plane data, sending the user plane data, or statistically analyzing a status of the user plane data;

wherein, under a condition that sending, by the sending party, the information related to processing the user plane data to the corresponding receiving party according to the preset rule comprises sending, by the sending party, the information related to processing the user plane data to the corresponding receiving party when processing of the sending party over the user plane data meets a preset condition, when the sending party comprises a Packet Data Convergence Protocol (PDCP) layer entity carried at a Master Evolved Node B (MeNB) side and the corresponding receiving party comprises a Radio Link Control (RLC) layer entity carried at a Secondary Evolved Node B (SeNB) side, the condition that processing of the sending party over the user plane data meets the preset condition comprises that: the PDCP layer entity carried at the MeNB side performs discarding a user plane data packet, and the information related to processing the user plane data comprises: indication information of discarding the user plane data packet by the PDCP layer entity;

when the sending party comprises an RLC layer entity carried at an SeNB side and the corresponding receiving party comprises a PDCP layer entity carried at an MeNB side, the condition that processing of the sending party over the user plane data meets the preset condition comprises that: the RLC layer entity carried at the SeNB side performs sending a user plane data packet offloaded by the PDCP layer entity, and the information related to processing the user plane data comprises: feedback information of successfully sending the user plane data packet offloaded by the PDCP layer entity by the RLC layer entity carried at the SeNB side;

when the sending party comprises an RLC layer entity carried at an SeNB side and the corresponding receiving party comprises a PDCP layer entity carried at an MeNB side, the condition that processing of the sending party over the user plane data meets the preset condition comprises that: the RLC layer entity carried at the SeNB side performs statistical analysis on a user plane data packet of the PDCP layer entity, and the information related to processing the user plane data comprises: statistic information of sending the user plane data packet of the PDCP layer entity by the RLC layer entity carried at the SeNB side;

when the sending party comprises an MeNB and the corresponding receiving party comprises an SeNB, the condition that processing of the sending party over the user plane data meets the preset condition comprises that: a PDCP layer entity carried at an MeNB side performs discarding a user plane data packet, and the information related to processing the user plane data comprises: indication information of discarding the user plane data packet by the PDCP layer entity carried at the MeNB side;

when the sending party comprises an SeNB and the corresponding receiving party comprises an MeNB, the condition that processing of the sending party over the user plane data meets the preset condition comprises that: an RLC layer entity carried at an SeNB side performs sending a user plane data packet offloaded by a PDCP layer entity, and the information related to processing the user plane data comprises: feedback information of successfully sending the user plane data packet offloaded by the PDCP layer entity by the RLC layer entity carried at the SeNB side; and when the sending party comprises an SeNB and the corresponding receiving party comprises an MeNB, the condition that processing of the sending party over the user plane data meets the preset condition comprises that: the SeNB performs estimation on a sending capability for an offloaded data packet of a PDCP layer entity of the MeNB, and the information related to processing the user plane data comprises: estimation information about the sending capability for the offloaded data packet of the PDCP layer entity of the MeNB.

2. The information interaction method according to claim 1, wherein sending, by the sending party, the information related to processing the user plane data to the corresponding receiving party in batches according to the preset rule comprises:

when a specified time interval expires, sending, by the sending party, the information related to processing the user plane data to the corresponding receiving party.

3. The information interaction method according to claim 1, wherein the information related to processing the user plane data further comprises: bearer identification information of a bearer corresponding to the user plane data.

4. An Evolved Node B (eNB), applied to a dual connectivity data offloading technology in a Long Term Evolution (LTE) system, comprising: a sending module and a data processing module, wherein the data processing module is configured to process user plane data carried by the eNB; and the sending module is configured to send information related to processing the user plane data by the data processing module to an opposite eNB in batches according to a preset rule, wherein processing the user plane data by the data processing module comprises: discarding the user plane data, sending the user plane data, or statistically analyzing a status of the user plane data;

wherein, under a condition that the sending module is configured to, when processing the user plane data by the data processing module meets a preset condition, send the information related to processing the user plane data by the data processing module to the opposite eNB, when the eNB serves as a Master eNB (MeNB) and the data processing module is a Packet Data Convergence Protocol (PDCP) layer entity, the condition that processing the user plane data by the data processing module meets the preset condition comprises that: the PDCP layer entity performs discarding a user plane data packet, and the information related to processing the user plane data comprises: indication information of discarding the user plane data packet by the PDCP layer entity;

when the eNB serves as a Secondary eNB (SeNB) and the data processing module is a Radio Link Control (RLC) layer entity, the condition that processing the user plane data by the data processing module meets the preset condition comprises that: the RLC layer entity performs sending a user plane data packet offloaded by a PDCP layer entity, and the information related to processing the user plane data comprises: feedback information of successfully sending the user plane data packet offloaded by the PDCP layer entity by the RLC layer entity carried at the SeNB;

when the eNB serves as an SeNB and the data processing module is an RLC layer entity, the condition that processing the user plane data by the data processing module meets the preset condition comprises that: the RLC layer entity performs statistical analysis on a user plane data packet of a PDCP layer entity, and the information related to processing the user plane data comprises: statistic information of sending the user plane data packet of the PDCP layer entity by the RLC layer entity carried at the SeNB; and when the eNB serves as an SeNB, the condition that processing the user plane data by the data processing module meets the preset condition comprises that: the data processing module performs estimation on a sending capability for a data packet of a PDCP layer entity of an MeNB, and the information related to processing the user plane data comprises: estimation information about the sending capability for the data packet of the PDCP layer entity of the MeNB.

5. The eNB according to claim 4, wherein the sending module is configured to:
when a specified time interval expires, send the information related to processing the user plane data by the data processing module to the opposite eNB.

* * * * *